(12) United States Patent
Xu et al.

(10) Patent No.: US 10,963,565 B1
(45) Date of Patent: Mar. 30, 2021

(54) INTEGRATED APPLICATION ANALYSIS AND ENDPOINT PROTECTION

(71) Applicant: Palo Alto Networks, Inc., Santa Clara, CA (US)

(72) Inventors: Zhi Xu, Fremont, CA (US); Elad Wexler, Givatym (IL); Asaf Weiss, Tel-Aviv (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 30 days.

(21) Appl. No.: 14/927,429

(22) Filed: Oct. 29, 2015

(51) Int. Cl.
| G06F 21/00 | (2013.01) |
| G06F 21/56 | (2013.01) |
| G06F 21/55 | (2013.01) |
| G06F 21/50 | (2013.01) |

(52) U.S. Cl.
CPC ............ *G06F 21/566* (2013.01); *G06F 21/50* (2013.01); *G06F 21/55* (2013.01); *G06F 21/554* (2013.01); *G06F 2221/033* (2013.01)

(58) Field of Classification Search
CPC .. G06F 21/567; G06F 2221/034; G06F 21/50; G06F 21/51; G06F 21/55; G06F 21/554; G06F 21/566; H04L 63/20; H04L 63/205
See application file for complete search history.

(56) References Cited

U.S. PATENT DOCUMENTS

| 6,591,306 | B1 * | 7/2003 | Redlich | ............. | H04L 29/12018 |
| | | | | | 370/401 |
| 8,171,545 | B1 * | 5/2012 | Cooley | ................. | G06F 21/552 |
| | | | | | 726/22 |
| 8,340,633 | B1 * | 12/2012 | Rege | .................... | H04M 15/28 |
| | | | | | 455/406 |
| 9,152,694 | B1 * | 10/2015 | Padidar | ................... | G06F 21/51 |
| 9,413,774 | B1 * | 8/2016 | Liu | ..................... | H04L 63/1416 |
| 9,614,863 | B2 * | 4/2017 | Kim | ..................... | H04L 63/1408 |
| 2004/0225877 | A1 * | 11/2004 | Huang | ................. | G06F 21/552 |
| | | | | | 713/100 |
| 2008/0120611 | A1 * | 5/2008 | Aaron | .................... | G06F 21/51 |
| | | | | | 717/174 |
| 2009/0077544 | A1 * | 3/2009 | Wu | ........................ | G06F 21/56 |
| | | | | | 717/160 |
| 2011/0225619 | A1 * | 9/2011 | Kesireddy | .......... | H04N 21/6582 |
| | | | | | 725/115 |
| 2012/0272318 | A1 * | 10/2012 | Doukhvalov | ............ | G06F 21/57 |
| | | | | | 726/24 |

(Continued)

OTHER PUBLICATIONS

Author Unknown, Fire Eye Introduces New Mobile Security Integration for Samsung KNOX-Enabled Devices, Mar. 2, 2015.

(Continued)

*Primary Examiner* — Edward Zee
(74) *Attorney, Agent, or Firm* — Van Pelt, Yi & James LLP

(57) ABSTRACT

An indication of an application to be installed on a local device is received. A request is transmitted to a remote server for information associated with the application. In some cases, in response to the receipt of a report from the remote server, a set of rules restricting behaviors of the application is implemented at the local device. In some cases, in response to the receipt of a report from the remote server, the installation of the application on the local device is prevented.

26 Claims, 8 Drawing Sheets

(56) References Cited

U.S. PATENT DOCUMENTS

| | | | | |
|---|---|---|---|---|
| 2012/0331441 | A1* | 12/2012 | Adamson | H04L 67/14 717/102 |
| 2013/0031600 | A1* | 1/2013 | Luna | G06F 21/60 726/1 |
| 2013/0097660 | A1* | 4/2013 | Das | G06F 21/52 726/1 |
| 2013/0111591 | A1 | 5/2013 | Topan | |
| 2013/0347094 | A1* | 12/2013 | Bettini | G06F 21/577 726/11 |
| 2014/0304700 | A1* | 10/2014 | Kim | G06F 8/65 717/173 |
| 2015/0319136 | A1* | 11/2015 | Xie et al. | H04L 63/1425 726/11 |
| 2015/0319182 | A1* | 11/2015 | Natarajan | H04L 63/145 726/24 |
| 2015/0339475 | A1* | 11/2015 | Feroz | G06F 21/53 726/23 |
| 2016/0012220 | A1* | 1/2016 | Padidar | H04L 63/105 726/22 |
| 2016/0162685 | A1* | 6/2016 | Feroz | G06F 9/45558 726/22 |
| 2016/0180087 | A1* | 6/2016 | Edwards | G06F 21/566 726/24 |
| 2016/0253159 | A1* | 9/2016 | Smith | G06F 8/61 717/172 |
| 2016/0285897 | A1* | 9/2016 | Gantman | G06F 21/552 |
| 2016/0285914 | A1* | 9/2016 | Singh | H04L 63/1416 |
| 2016/0321452 | A1* | 11/2016 | Richardson | H04W 12/1208 |
| 2016/0330239 | A1* | 11/2016 | Han | H04L 63/1483 |
| 2017/0093918 | A1* | 3/2017 | Banerjee | H04L 63/101 |
| 2017/0099592 | A1* | 4/2017 | Loeb | G06Q 10/107 |
| 2017/0103201 | A1* | 4/2017 | Fox | G06F 21/566 |
| 2017/0147320 | A1* | 5/2017 | Persson | G06F 8/65 |
| 2017/0346843 | A1* | 11/2017 | Zhang | G06F 21/44 |

OTHER PUBLICATIONS

Author Unknown, Intent, Android Developers, Downloaded from http://developer.android.com/reference/android/content/Intent.html on Oct. 12, 2015.

Yang et al., IntentFuzzer: Detecting Capability Leaks of Android Applications, Jun. 2014.

Eswari et al., "A practical business security framework to combat malware threat," World Congress on Internet Security (WorldCIS-2012), Guelph, ON, pp. 77-80. 2012.

Mujumdar et al., "Analysis of Signature-Based and Behavior-Based Anti-Malware Approaches", from International Journal of Advanced Research in Computer Engineering and Technology (IJARCET), vol. 2, Issue 6, Jun. 2013.

* cited by examiner

INTEGRATED APPLICATION ANALYSIS AND ENDPOINT PROTECTION

BACKGROUND OF THE INVENTION

Individuals are increasingly spending more time using mobile devices and less time using traditional computers. This shift in usage is present both in personal and in business contexts. For example, employees of companies are increasingly using mobile devices for their work related activities. In conjunction with this shift in user behavior, nefarious individuals and organizations are increasingly targeting mobile devices with malicious applications ("malware"). Unfortunately, it can be difficult to protect mobile devices using existing techniques.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
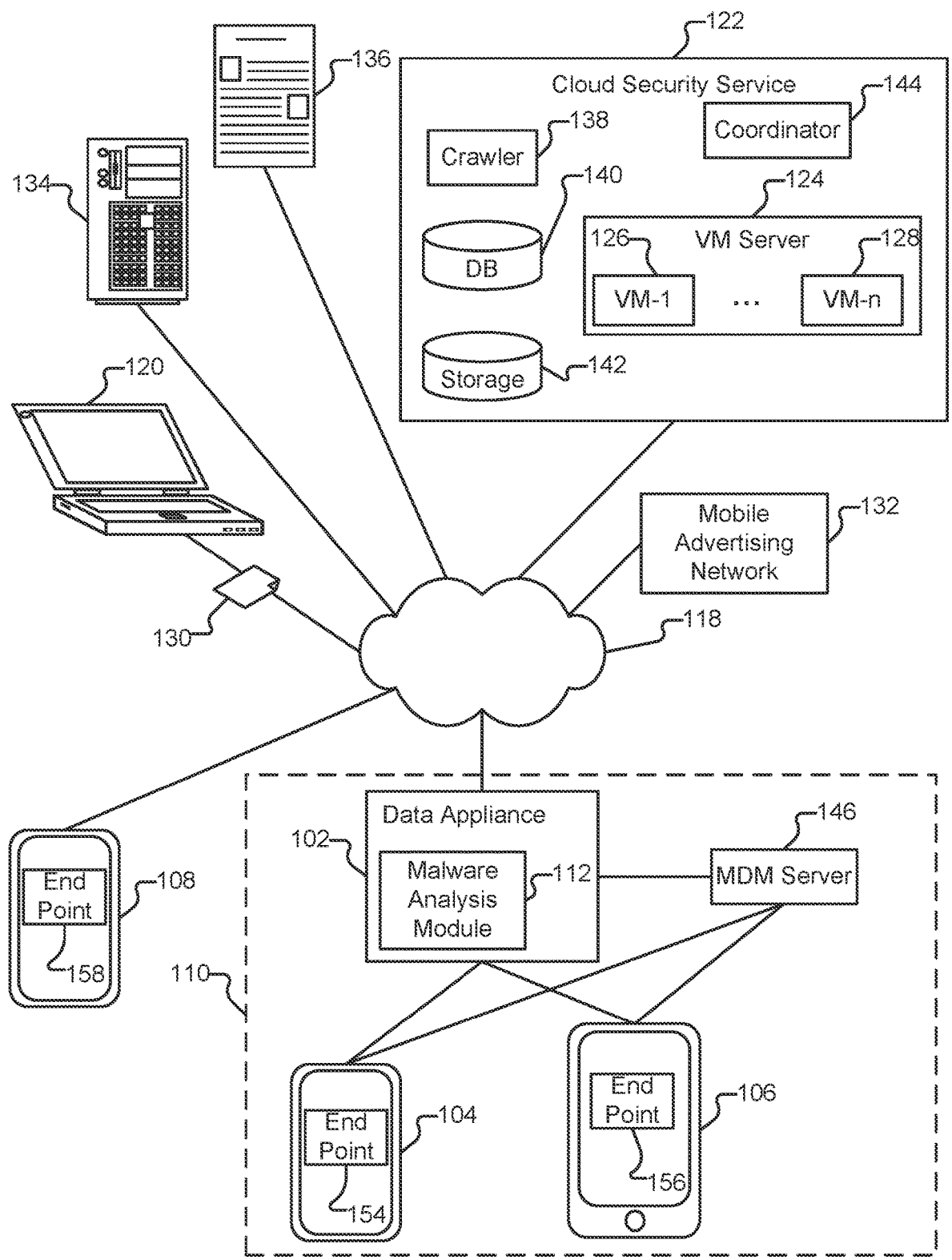
FIG. 1 illustrates an example of an environment in which mobile malware is detected and prevented from causing harm.

FIG. 1 illustrates an example of an environment in which malicious mobile applications (malware) are detected and prevented from causing harm. The term "application" is used throughout the Specification to collectively refer to programs, bundles of programs, manifests, packages, etc., irrespective of form/platform. The term "malware" as used herein refers to an "application" that engages in behaviors, whether clandestinely or not (and, whether illegal or not), of which a user (or as applicable, an administrator or other entity specifying user device policies) does not approve/would not approve if fully informed. Examples of malware include viruses, rootkits, spyware, keyloggers, etc. One particular example of mobile malware is a malicious .apk file that appears to an end user to be a free game, but stealthily sends SMS premium messages (e.g., costing $10 each), running up the end user's phone bill. Another example of mobile malware is an application that stealthily collects the user's contacts and sends them to a spammer. Yet another example of mobile malware is an application that collects and reports to a remote server the end user's location (but does not offer a location: based service to the user, such as a legitimate mapping service would provide). Other forms of malware can also be detected/thwarted using the techniques described herein. Further, while various techniques are described herein in conjunction with use of mobile devices (e.g., cellular telephones/tablet devices), use of techniques described herein is not limited to the context of mobile devices. For example, techniques described herein can also be used in conjunction with applications used by other types of devices, such as laptop/desktop computers, gaming consoles, set-top boxes, etc. As one example, an end user computer (e.g., at a home, in a school, in an enterprise environment, etc.) can make use of the techniques described herein (e.g., when an attempt to install software on that computer is made).

Suppose a nefarious individual wishes to propagate mobile malware (such as malware 130) via system 120 to end users. A variety of approaches can be used by the nefarious individual. As one example, the individual can upload mobile malware 130 to a software distribution platform such as platform 134 (also referred to as an "an app store"). The nefarious individual hopes that unsuspecting users of platform 134 (e.g., any of applicable client devices 104-108) will download the malicious application 130 from platform 134 and install it on their devices. Example embodiments of platform 134 include Google Play, the iOS App Store, BlackBerry World, the Windows Phone Store, and the Amazon Appstore. Additional examples of software distribution platforms include third party software distribution platforms, such as the Baidu App Store, GetJar, and Handango. Another way the nefarious individual can attempt to propagate mobile malware is by posting it on a message/forum site, such as site 136. In this scenario, the nefarious individual again hopes that unsuspecting users of site 136 will download and install the malicious application 130. Yet another way for the nefarious individual to attempt to propagate mobile malware 130 is to attach it to an email message and hope that the recipient (e.g., the owner of device 104) will open the attachment and install the program. Yet another way for the nefarious individual to attempt to propagate mobile malware 130 is to include it in an advertising company's ad network (e.g., mobile ad network 132) and hope that the user will install the promoted program.

In the example shown in FIG. 1, client devices 104 and 106 are a smartphone and a tablet (respectively) present in an enterprise network 110. Client device 108 is outside enterprise network 110. Client device 104 runs an Android-based operating system, and client device 106 runs Windows 10. Client device 108 runs a version of iOS. Each of the devices shown can be protected using techniques described herein. Other devices, running other operating systems, whether mobile-oriented or not, can also be protected using the techniques described herein. As will be described in more detail below, in various embodiments, endpoint protection is provided to each of devices 104-108. Such endpoint protection can be provided in a variety of manners and by a variety of entities, whether working individually, or in cooperation. For example, each of devices 104-108 can execute a program, or set of programs, providing endpoint protection services. The endpoint protection can be natively incorporated into the operating system running on the device (e.g., by the author of the operating system, the device manufacturer, or another appropriate entity including the operator of service 122), and can also be applied aftermarket (e.g., with the user or another appropriate entity installing an endpoint protection application or application suite on the device). Some examples of functionality provided by endpoint protection include local (to the device) firewalling, malicious application scanning, data loss/leakage prevention, sandboxing, etc. The endpoint protection application can make use of a variety of resources, including white/blacklists of MD5 or other hashes of known good/bad applications, stored in an appropriate storage location accessible to the endpoint protection application. The white/blacklists can be provided by a third party, such as an operator of service 122, and can also be configured by an administrator, by the user, etc., as applicable. In accordance with techniques described herein, and as described in more detail below, endpoint protection can integrate with remote services (e.g., offered by cloud security service 122) in providing protection to the device on which the endpoint protection is executing. In particular, endpoint protection applications 154-158 can monitor their respective local devices for various behaviors, and can determine whether such behaviors are suspicious/malicious based at least in part on information obtained from service 122. A variety of actions can be taken in response to such detections, as also described in more detail below. Using techniques described herein, the cloud security service 122 provides review services for applications, and the endpoint protection applications restrict the behaviors of the applications (when executing in respective devices) to only those that have been reviewed and confirmed non-malicious by the cloud security service. If an application, such as malicious application 130, attempts to bypass the analysis performed by the cloud security service, the malicious nature of the application will be caught by the endpoint protection application when the malicious application attempts to engage in malicious behavior on end user devices. Additional benefits include the endpoint protection application collecting additional behavior information from executing applications and reporting behaviors back to the cloud security service, and helping system administrators better determine which kinds of behaviors a given application will engage in after installation.

In some embodiments, data appliance 102 is configured to enforce policies regarding communications between clients such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110. In some embodiments, other devices are included in network 110, such as a mobile device management (MDM) server 146, which is in communication with data appliance 102.

As shown, MDM server 146 communicates with mobile devices (e.g., 104 and 106) to determine device status and to report (e.g., periodically) such mobile device status information to data appliance 102. MDM server 146 can be configured to report the presence of known malicious applications installed on devices such as device 104/106, and/or can be configured to receive indications of which mobile applications are malicious (e.g., from appliance 102, from service 122, or combinations thereof). In some embodiments, data appliance 102 is configured to enforce policies against devices 104 and 106 based on information received from MDM server 146. For example, if device 106 is determined to have malware installed on it (e.g., by MDM server 146), data appliance 102 (working in cooperation with MDM server 146) can deny client 106 access to certain enterprise resources (e.g., an Intranet) while allowing device 104 (which does not have malware installed upon it) access to those resources. In various embodiments, data appliance 102 is configured to enforce policies against devices 104 and 106 based on information received from the devices themselves (e.g., as provided by endpoint security applications 154 and 156 respectively running on devices 104 and 106 to appliance 102). While MDM server 146 is shown in the environment of FIG. 1, the presence of an MDM server 146 is not required to implement various embodiments of techniques described herein, whether inside or outside an enterprise network setting. As one example, client device 108 (which is outside enterprise network 110, and is executing end point protection application 158) can benefit from techniques described herein, as will be described in more detail below.

Figure 2:
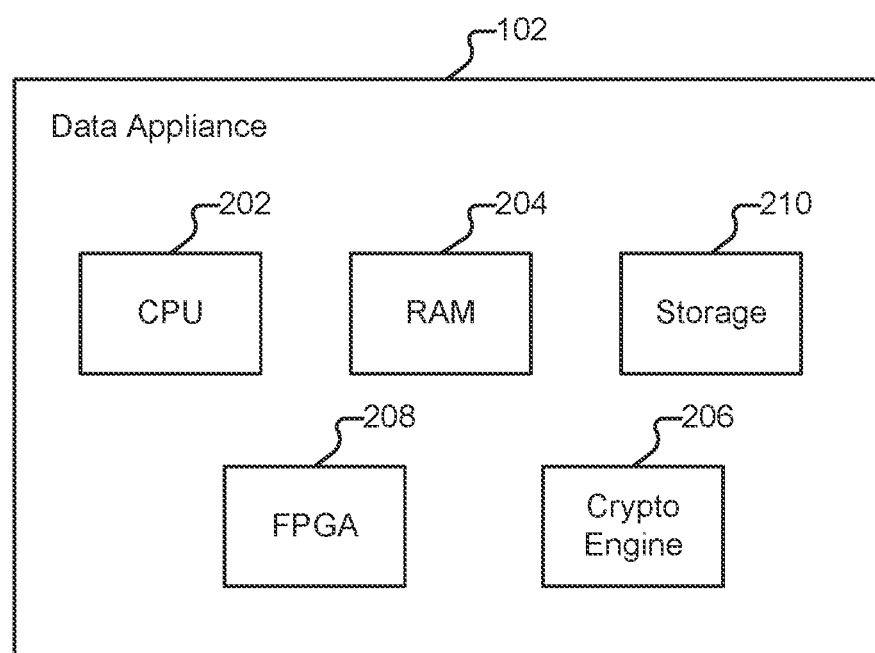
FIG. 2 illustrates an embodiment of a data appliance.

An embodiment of a data appliance is shown in FIG. 2. The example shown is a representation of physical components that are included in appliance 102, in various embodiments. Specifically, appliance 102 includes a high performance multi-core CPU 202 and RAM 204. Appliance 102 also includes a storage 210 (such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Appliance 102 can take a variety of forms. For example, appliance 102 can be a single, dedicated device (e.g., as shown), and can also be a set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104 (or client 106) by an agent or other software executing at least partially on client 104 (or client 106), such as endpoint protection executing on any/all of clients 104-108 (e.g., applications 154-158).

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

Suppose data appliance 102 intercepts an email sent by system 120 to device 104 to which a copy of malware 130 has been attached. (As an alternate, but similar scenario, data appliance 102 could intercept an attempted download by device 104 of malware 130 from platform 134 or site 136.) Data appliance 102 determines whether a signature for the attachment (i.e., malware 130) is present on data appliance 102. A signature, if present, can indicate that the attachment is known to be safe, and can also indicate that the attachment is known to be malicious. If no signature for the attachment is found, in some embodiments, data appliance 102 is configured to provide the attachment (malware 130) to a mobile malware analysis module 112 for real-time analysis. As an alternate example, endpoint protection (e.g., any of 154-158) can detect when an attempt is made to install software (e.g., malware 130) on a device, and communicate (whether directly, or indirectly—such as through data appliance 102) with service 122 to determine information about the application, in accordance with techniques described herein.

As will be described in more detail below, a combination of static and dynamic analysis can be performed on applications such as application 130 to determine whether they are malicious. The analysis of malware 130 can be performed by a malware analysis module 112 included in data appliance 102, implemented as a set of one or more programs executing on appliance 102. Instead of or in addition to on-premise analysis, appliance 102 can also send a copy of malware 130 to cloud security service 122 for analysis. Cloud security service 122 can also (or instead) obtain copies of mobile applications for evaluation from sources other than data appliance 102. As one example, cloud security service 122 can include a crawler 138 configured to periodically crawl platform 134 and/or site 136, looking for new or updated applications. Such applications (an example of which is malware 130) can then be analyzed by cloud security service 122. In some embodiments, platform 134 and/or site 136 make copies of applications available to cloud security service 122 via an Application Programming Interface (API) made available by service 122, instead of or in addition to crawler 138 obtaining such copies. Further, as will be described in more detail below, in various embodiments, devices 104-108 make copies of malware such as malware 130 available to cloud security service 122 (or as applicable, to malware analysis module 112), such as in conjunction with a local user attempting to install a copy of the malware on the receptive device.

Copies of received applications (i.e., awaiting analysis) are stored in storage 142 and analysis is commenced (or scheduled, as applicable). As will be described in more detail below, results of the analysis (and additional information pertaining to the applications) are stored in database 140. In some embodiments, cloud security service 122 comprises one or more dedicated commercially available hardware servers (e.g., having multi-core processor(s), 8G+ of RAM, gigabit network interface adaptor(s), and hard drive(s)) running typical server-class operating systems (e.g., Linux). In various embodiments, service 122 is implemented across a scalable infrastructure comprising multiple such servers, solid state drives, and/or other applicable high-performance hardware. Cloud security service 122 can comprise several distributed components, including components provided by one or more third parties. For example, portions or all of cloud security service 122 can be implemented using the Amazon Elastic Compute Cloud (EC2) and/or Amazon Simple Storage Service (S3). Further, as with data appliance 102, when cloud security service 122 is referred to as performing a task, such as storing data or processing data, it is to be understood that a sub-component or multiple sub-components of cloud security service 122 (whether individually or in cooperation with third party components) may cooperate to perform that task. As one example, cloud security service 122 can optionally perform its analysis in cooperation with one or more virtual machine (VM) servers, such as VM server 124.

An example of a virtual machine server is a physical machine comprising commercially available server-class hardware (e.g., a multi-core processor, 4+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers cloud security service 122, but may also be provided by a third party. As one example, the virtual machine server can rely on EC2, with the remainder portions of cloud security service 122 provided by dedicated hardware owned by and under the control of the operator of cloud security service 122. As will be explained in more detail below, virtual machine server 124 is configured to provide one or more virtual machines 126-128 for emulating mobile devices. The virtual machines can execute a variety of operating systems and/or versions thereof. Observed behaviors resulting from executing mobile applications in the virtual machines are logged and analyzed (e.g., for indications that the application is malicious). In some embodiments, the log analysis is performed by the VM server (e.g., VM server 124). In other embodiments, the analysis is performed at least in part by other components of service 122, such as coordinator 144.

In some embodiments, cloud security service 122 makes available the results of its analysis of mobile applications via a list of signatures (and/or other identifiers) to appliance 102, to any/all of devices 104-108 (and/or to MDM server 146) as part of a subscription. For example, service 122 can send a content package that identifies malware apps periodically (e.g., daily, hourly, or some other interval, and/or based on an event based on a policy). An example content package includes a listing of identified malware apps (e.g., information in the content package can include an app package name, an app hash code for uniquely identifying the app, and a malware name for each identified malware app). The subscription can cover the analysis of just those files intercepted by data appliance 102 and sent to cloud security service 122 by data appliance 102, and can also cover signatures of all malware known to cloud security service 122 (or subsets thereof, such as just mobile malware but not other forms of malware (e.g., PDF malware)). Cloud security service 122 is configured, in various embodiments, to provide security services to entities in addition to or instead of an operator of data appliance 102. For example, a carrier providing cellular service to device 108 can contract with cloud security service 122 to analyze applications which device 108 attempts to download. As another example, the owner of device 108 can contract with cloud security service 122 to analyze applications (whether by obtaining a subscription in conjunction with obtaining endpoint protection, or independently). As yet another example, an operator of app store 134, and/or an operator of site 136 can contract with cloud security service 122 to analyze mobile applications (e.g., for a fee).

In the event malware 130 is determined to be malicious (whether by cloud security service 122 or by data appliance 102), appliance 102 can be configured to automatically block the file download based on the analysis result. As will be described in more detail below, in various embodiments, endpoint protection executing on devices 104-108 can similarly block a user of the respective devices from completing an install of the malicious application (instead of/in addition to relying on appliance 102 to prevent the downloading of the malicious application). Further, a signature can be generated for malware 130 and distributed (e.g., to other data appliances) to automatically block future file transfer requests to download the file determined to be malicious.

In some cases, an application is malicious, but may not be (at least initially) flagged as malicious by cloud security service 122 (or malware analysis module 112 or other appropriate entity as applicable) during analysis. One reason for this is that malware authors increasingly use sophisticated techniques to conceal the malicious behaviors of their applications in order to evade detection by services such as service 122. A malicious application may attempt to reserve its malicious behavior for when the malicious application is executing on a victim's device. Even where service 122 can (e.g., through static and dynamic analysis) identify some of the concealment techniques on the part of malware authors, new approaches by malware authors to evade detection of the malicious nature of their applications are continuously being developed.

Suppose a typical malware analysis system can allocate five minutes to evaluating an arbitrary application for maliciousness (e.g., due to available resources, amounts of delay tolerated by users awaiting maliciousness verdicts, etc.). A malware author might suppress the expression of malicious aspects of an application for an hour, or a day, or longer, from the point the application is first installed and run on an end user device, and evade detection of the application's maliciousness accordingly. The amount of time the malicious behavior is suppressed can be programmed into the application (e.g., as a "sleep( )" or other routine), and can also rely on an external instruction, such as by having the application contact a command and control server. As another example of an evasion technique, malware can be configured to detect whether it is running in a virtualized environment (e.g., under the assumption that the malware is being observed for security analysis reasons in a VM such as VM 126) and only take benign actions if so. As yet another example, a malicious application may initially install with a minimum set of functionality, and then, once installed, download additional, malicious elements (e.g., as an update, as a patch, as an additional library, etc.). If an analysis system only analyzes the application in its initial form, malicious behaviors (e.g., as accomplishable by the malware once it has updated/patched itself) may go undetected. As will be described in more detail below, using techniques described herein, devices such as devices 104-108 can be protected from malicious applications, including those not initially determined to be malicious (e.g., those not flagged as malicious by an initial analysis by service 122).

Analyzing Mobile Applications

Figure 3:
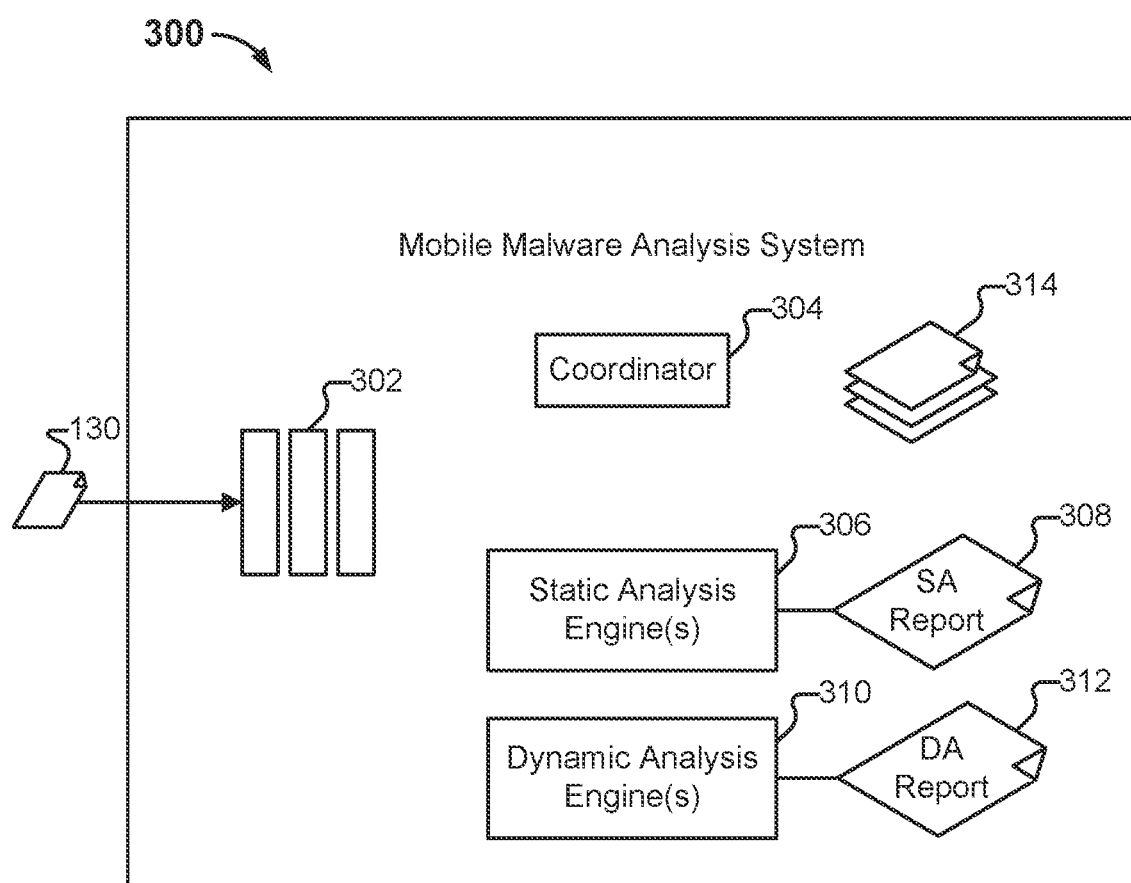
FIG. 3 illustrates an example of logical components included in a system for performing static and dynamic analysis on a mobile device application.

FIG. 3 illustrates an example of logical components included in a system for performing static and dynamic analysis on a mobile device application. In various embodiments, system 300 is implemented using a single device. For example, the functionality of system 300 can be implemented on data appliance 102 which includes an analysis module 112. System 300 can also be implemented, collectively, across multiple distinct devices. For example, the functionality of system 300 can be provided by cloud security service 122.

As will be described in more detail below, in various embodiments, system 300 is configured to perform a hybrid, two part analysis on mobile device applications. First, static analysis is performed, in part to check the capabilities of the application (e.g., potential avenues for being malicious). Then, dynamic analysis is performed to check whether the application actually uses the capabilities maliciously. The hybrid approach helps improve the accuracy of mobile malware detection, while lowering the false positive rate of mislabeling benign application files as malware (e.g., due to harmless but poor programming techniques on the part of the application's author). An initial verdict pertinent to the application can be made based on both the application's content (e.g., where the application includes a URL verified to be a malicious website), and on the context in which it behaves (e.g., whether the usage of a suspicious capability is made aware to an end user or is performed silently in the background). As will be described in more detail below, in various embodiments, in the event that the verdict is that an application being evaluated is malicious, the application can be blocked from being installed on a device such as any of devices 104-108 (e.g., by endpoint protection executing on the implicated devices). In the event that the verdict is not malicious, behaviors observed during analysis can be recorded and used to enforce limits on the application once installed, reducing the ability of a malicious application to engage in behaviors not observed during analysis.

In various embodiments, system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or service 122). Examples of information included in collection 314 are: URLs of known malicious websites; URLs of known safe websites; signatures, hashes, and/or other identifiers of known malicious applications; signatures, hashes, and/or other identifiers of known safe applications; and signatures, hashes, and/or other identifiers of known malicious files (e.g., Android exploits files).

Ingestion

In some embodiments, when a new mobile application (or, as applicable, an updated one) is received for analysis (e.g., an existing signature associated with the mobile application is not present in system 300), it is added to processing queue 302. In the following example, suppose the application is called "game.apk," (the malicious game 130) but that it is not yet known whether or not the game is malicious. As explained above, a mobile application can be received for analysis in a variety of ways. As one example, a mobile application can be received by data appliance 102 for analysis when data appliance 102 intercepts an email or other data transmission intended for device 104 that includes the application. One additional example of the receipt of a mobile application is by service 122 of the application from data appliance 102, platform 134, or site 136 for analysis (e.g., via an API). Another additional example of receipt of a mobile application is crawling by service 122 of systems such as platform 134 or site 136. Yet another way a mobile application can be received for analysis is at the direction of endpoint protection executing on a device onto which an attempt to install the application is being made. For example, when users of any of devices 104-108 attempt to install new applications on their respective devices, endpoint protection executing on the devices can, upon notification of the attempted install, send a copy of the application to service 122 (e.g., via an API), can send a hash of the application to service 122 (e.g., to determine whether information pertinent to the application is already present e.g., in database 140), can provide a link to the source of the application (e.g., where the user is attempting to install the application from platform 134 or site 136), etc.

Static Analysis

Coordinator 304 monitors the queue, and as resources (e.g., a static analysis worker) become available, coordinator 304 fetches an application from queue 302 for processing (e.g., fetches game.apk). In particular, coordinator 304 first provides the application to static analysis engine 306 for static analysis. In some embodiments, one or more static analysis engines are included within system 300, where system 300 is a single device. In other embodiments, static analysis is performed by a separate static analysis server that includes a plurality of workers (i.e., a plurality of instances of static analysis engine 306).

One example of how static analysis can be performed, using game.apk (an Android application) as an example, is as follows. Similar approaches can be used for applications executable on other platforms. First, the static analysis engine 306 uses a tool, such as Android apktool, to reverse game.apk into an intermediate source code form. The output of the reversing operation is, in some embodiments, a set of .smali files—the direct output of the disassembly from Java virtual machine language, and other resource files included in the game.apk file.

The static analysis engine obtains general information about the application, and includes it (along with heuristic information described below) in a static analysis report 308. The report can be created by the static analysis engine, or by coordinator 304 (or by another appropriate component) which can be configured to receive the information from static analysis engine 306. In some embodiments, the collected information is stored in a database record for the application (e.g., in database 140), instead of or in addition to a separate report 308 being created (i.e., portions of the database record form the report 308). Examples of collected information include: the package name, shared UID, APK file signer information, permissions claimed, and sensitive API calls included in the source (e.g., sending or erasing SMS messages, accessing the phonebook, and tracking user location changes). The static analysis engine also collects and stores information pertaining to the running context of the application, such as: the minimum version of the Android OS required to run the application (the minimum SDK version), and the sensors it will have access to.

The static analysis engine also retrieves (e.g., from database 140) a set of heuristic rules to be applied on the .smali code and the resource files. In particular, static analysis engine 306 determines which rules are triggered (also referred to as "features hit") by the source code. Examples of features include the following (where an example of "the received APK" is "game.apk"):

1. "Contains APK file": If the received APK contains other APK files within the package, the received APK is suspicious.

2. "Contains Known Malicious APK File": If there exist other APK files within the package, those included APK files are analyzed separately (e.g., are added to the queue or checked with existing known malicious applications). If any of the included APK files are determined to be malicious, the received APK is considered malicious as well.

3. "Hide Menu Icons": The menu icons are graphical elements placed in the options menu. If the received APK does not have the menu icons or attempts to hide the menu icons, it is suspicious.

4. "File Type Mismatch": If the received APK contains files whose formats do not match their extensions, it is highly suspicious (of maliciousness). For example, several Android malware families (e.g., Android.Droiddream family) attempt to hide additional included APK files as database files by naming them with the ".db" extension rather than ".apk." As another example, a file labeled a ".png" may instead be an ".xml" file used for a command and control channel. As explained below, a developer may inadvertently misname a file (or otherwise misname a file without malicious intent).

5. "Contain Executable Files": If the received APK contains executables for the Linux platform (e.g. the .elf files), it is suspicious.

6. "Contain Malicious Executable Files": If the included executable files are known malicious files, e.g. known exploit libraries, the received APK is malicious.

7. "Install Other APK": If the received APK has the capacity of installing other APK files (e.g., while running in the background), it is suspicious.

8. "Uninstall Other APK": If the received APK has the capacity of uninstalling other APK files (e.g., while running in the background), it is suspicious.

9. "Contain Dangerous Shell Commands": If the received APK contains dangerous shell commands, e.g. chmod and su, it is malicious.

10. "Require Abnormal Permissions": If the received APK requires permissions such as "system debug," or "authenticate accounts," and/or factory adjustments such as setting process limits, it is suspicious.

11. "Contain Phone number": If the received APK contains phone number(s), it is suspicious (e.g., because the application may place calls or text messages to premium numbers).

12. "Contain URLs": If the received APK contains URL(s) within the source code, it is suspicious.

13. "Contain Malicious URL": Any URL(s) found are compared against a list of known malicious sites. If the URL(s) link to malicious site(s), the received APK is malicious.

14. "Send SMS": If the APK has the permission to send SMS messages, it is suspicious.

15. "Contain Autorun.inf file": If the received APK contains an autorun.inf file that is for Windows platform, it is malicious (e.g., because an attempt will be made by the user's computer to execute the file if the user connects the phone to the computer).

16. "Duplicate Entries": If the APK has duplicate entry names (e.g. containing two classes.dex files in the same folder within the APK) in the file, it is malicious. (E.g., because it is attempting to exploit the Android security vulnerability #8219321.

The static analysis engine stores the results of the rule testing in a database (e.g., database 140) in the record associated with the application being tested (and/or includes the results in report 308 as applicable). In some embodiments, the static analysis engine also forms a verdict with respect to the application (e.g., "safe," "suspicious," or "malicious"). As one example, the verdict can be "malicious" if even one "malicious" static feature is present in the application. As another example, points can be assigned to each of the features (e.g., based on severity if found; based on how reliable the feature is for predicting malice; etc.) and a verdict can be assigned by static analysis engine 306 (or the coordinator, if applicable) based on the number of points associated with the static analysis results. A "safe" verdict can be alternately considered as a "nothing malicious (or suspicious, as applicable) detected" verdict. The potential exists, for example, that a clever malware author has crafted the app in such a way as to appear benign even when it is not. As will be described in more detail below, characteristics of an app deemed "safe" by system 300 can be recorded and used to generate rules that govern how the app, once installed on an end user device, is permitted to operate.

In some cases, an application may appear "suspicious" to static analysis engine 306 due to poor programming choices made by a harmless programmer, rather than a malicious one. As one example, the programmer may have named an executable that handles playing of an MP3 file with a ".mp3" extension. This sort of filetype mismatch (i.e., that an executable is incorrectly labeled with a non-executable extension) could indicate malicious behavior (i.e., a malicious individual is trying to hide a malicious executable through misnaming the filename). Here, however, the file was inadvertently mislabeled. Static analysis engine 306 notes (e.g., with rule "File Type Mismatch" being included in the static analysis report) that there is a "suspicious" aspect to the file which warrants additional investigation during dynamic analysis to reach a conclusion as to whether the application is benign or malicious.

In some embodiments, static analysis engine 306 will conclude that the application will crash (and/or cause the virtual machine to crash) if executed. As one example, static analysis engine 306 can perform integrity checking and determine that a file is missing, corrupted, unsigned, etc. In this scenario, dynamic analysis can be skipped (e.g., with static analysis noting in report 308 that the application will crash if an attempt is made to install/execute it).

Dynamic Analysis

Once the static analysis is complete, coordinator 304 locates an available dynamic analysis engine 310 to perform dynamic analysis on the application. As with static analysis engine 306, system 300 can include one or more static analysis engines directly. In other embodiments, dynamic analysis is performed by a separate dynamic analysis server that includes a plurality of workers (i.e., a plurality of instances of dynamic analysis engine 310).

Each dynamic analysis worker manages a mobile device emulator (e g, running in a virtual machine). Results of the static analysis (e.g., performed by static analysis engine 306), whether in report form (308) and/or as stored in database 140, or otherwise stored are provided as input to dynamic analysis engine 310. The static report information is used to help customize the type of dynamic analysis performed by dynamic analysis engine 310, conserving resources and/or shortening the time required to evaluate an application. As one example, if static analysis has concluded that the application does not have the ability to access SMS messages, during dynamic analysis, the receipt of SMS messages will not be simulated in some embodiments. As another example, if static analysis has concluded that the application has the ability to access GPS information, during dynamic analysis, various changes in location of the device will be simulated. However, if the application lacks the ability to access GPS information, in some embodiments no location changes will be simulated (reducing the amount of time/computing resources needed to complete dynamic analysis). As yet another example, dynamic analysis engine 310 will determine which emulator(s) to run based on the minimum operating system version number required by the application (and determined during static analysis). If the minimum version number is Android 4.0, dynamic analysis engine 310 will launch an Android emulator having that version number (and, in some embodiments, will not attempt to emulate a lower version of Android). If the minimum version number is Android 2.3, multiple emulators can be used to evaluate the application (e.g., Android 2.3, and any higher versioned emulators, such as Android 4.0). Where multiple emulators are used, a single dynamic analysis engine can manage all of the emulators (whether in sequence or in parallel), or multiple dynamic analysis engines can be used (e.g., with each managing its own emulator), as applicable.

The dynamic analysis engine/worker begins analysis by preparing and setting up the running environment for the application to be tested. Examples of operations carried out by the dynamic analysis engine/worker at this point include: (1) determining which system services should be started (e.g., simulated motion sensor readings and simulated location changes); and (2) determining what set of simulated user operations should take place (e.g., performed after installation, in sequence).

The dynamic analysis engine/worker loads an appropriate emulator (e.g., Android version 2.3) and installs the application to be analyzed. The emulators used by mobile malware analysis system 300 are instrumented. For example, they are configured to log activities as they occur in the emulator (e.g., using a customized kernel that supports hooking and logcat). Further, network traffic associated with the emulator is captured (e.g., using pcap).

The application is executed and various applicable actions (e.g., selected based on static analysis report 308) are performed (e.g., by the dynamic analyzer executing commands via an Android Debug Bridge ("adb") connection and/or through the use of a service coordinator included in the modified emulator and configured to orchestrate the simulation of user events such as button presses as commanded by the dynamic analysis engine). As one example, if the application was determined during static analysis to have access to location information, changes in location will be simulated in the emulator and any resulting behaviors logged. In some embodiments the log data is stored as a temporary file on system 300.

In some embodiments, dynamic analysis is performed in two stages. In particular, after the application has been installed and executed (with associated simulated information/events) and a first log file is created (e.g., "logcat1.txt"), a reboot of the emulator is performed and the application is launched and interacted with again, resulting in a second log file (e.g., "logcat2.txt"). Dynamic analysis engine 310 evaluates both log files, along with any network traffic captured during the two stages (e.g., using pcap).

Examples of features that can be detected during dynamic analysis include the following (where an example of "the received APK" is again "game.apk"):

1. "Connect To Unknown Websites": If the received APK attempts to connect to an unknown website (e.g., one that is not on a whitelist of known safe websites), it is suspicious.

2. "Connect To Malicious Websites": If the received APK attempts to connect to a known malicious website, it is malicious.

3. "Add Malicious Bookmarks": If the received APK attempts to add a known malicious website to the bookmarks of a browser, it is malicious.

4. "Install Other APK": If the received APK attempts to install other APK files, it is malicious. The APK to be installed can either be included within the original (received) APK file, or downloaded by the received APK from a remote server.

5. "Uninstall Other APK": If the received APK attempts to uninstall other installed apps, it is malicious.

6. "Uninstall Itself": If the received APK attempts to uninstall itself after installation, it is malicious.

7. "Send SMS In Background": If the received APK attempts to send SMS messages while running in the background, it is malicious.

8. "Insert SMS To Inbox": If the received APK attempts to insert an SMS message into the Inbox (e.g., while running in the background), it is malicious.

9. "Delete SMS from Inbox": If the received APK attempts to delete one or more SMS messages present in the Inbox, it is malicious.

10. "Send SMS To Contacts": If the received APK attempts to send multiple contacts automatically, it is malicious.

11. "Auto Reply SMS": If the received APK attempts to send an SMS upon receiving an SMS, it is malicious.

12. "Add APN Settings": If the received APK attempts to insert new APN settings, it is suspicious.

13. "Call Sensitive Service": If the received APK attempts to call sensitive system services or execute dangerous shell commands (e.g. the "mount" command), it is malicious.

14. "Load Malicious File": If the received APK loads one or more files when running, the loaded files will be checked separately. If the loaded files are malicious, then the received APK is malicious.

15. "Create APK Files": If the received APK attempts to save other APK files in one of the system folders (e.g., "/system/app" or "/data/app"), it is suspicious. The saved APK files will be checked separately.

16. "Create Malicious File": If the received APK attempts to create a file with a sensitive file type, such as .elf or autorun.inf, it is malicious.

17. "Access Hidden Folder Or Files": If the received APK attempts to create or access hidden folders or files on the local storage and outside its own local storage folder, it is malicious. An example of a hidden folder is "./.hidden/."

18. "Change File Permission": If the received APK attempts to change the default permissions of local files to "executable," and this file has not been checked in static analysis, or has been determined to be malicious in static analysis, it is malicious.

As with the static analysis engine, the dynamic analysis engine stores the results of the rule testing in the database in the record associated with the application being tested (and/or includes the results in report 312 as applicable). In some embodiments, the dynamic analysis engine also forms a verdict with respect to the application (e.g., safe, suspicious, or malicious). As one example, the verdict can be "malicious" if even one "malicious" dynamic feature is present in the application. As another example, points can be assigned to each of the features (e.g., based on severity if found; based on how reliable the feature is for predicting malice; etc.) and a verdict can be assigned by dynamic analysis engine 310 (or the coordinator, if applicable) based on the number of points associated with the static analysis results. As with static analysis, a "safe" verdict (e.g., determined during dynamic analysis) can be alternately considered as a "nothing malicious (or suspicious, as applicable) detected" verdict. The potential exists, for example, that a clever malware author has crafted the app in such a way as to appear benign even when it is not. As will be described in more detail below, characteristics of an app deemed "safe" by system 300 can be recorded and used to generate rules that govern how the app, once installed on an end user device, is permitted to operate.

In some embodiments, a final verdict associated with the application is assessed (e.g., based on a combination of report 308 and report 312) by coordinator 304.

Example Process Performed by Malware Analysis System

Figure 4:
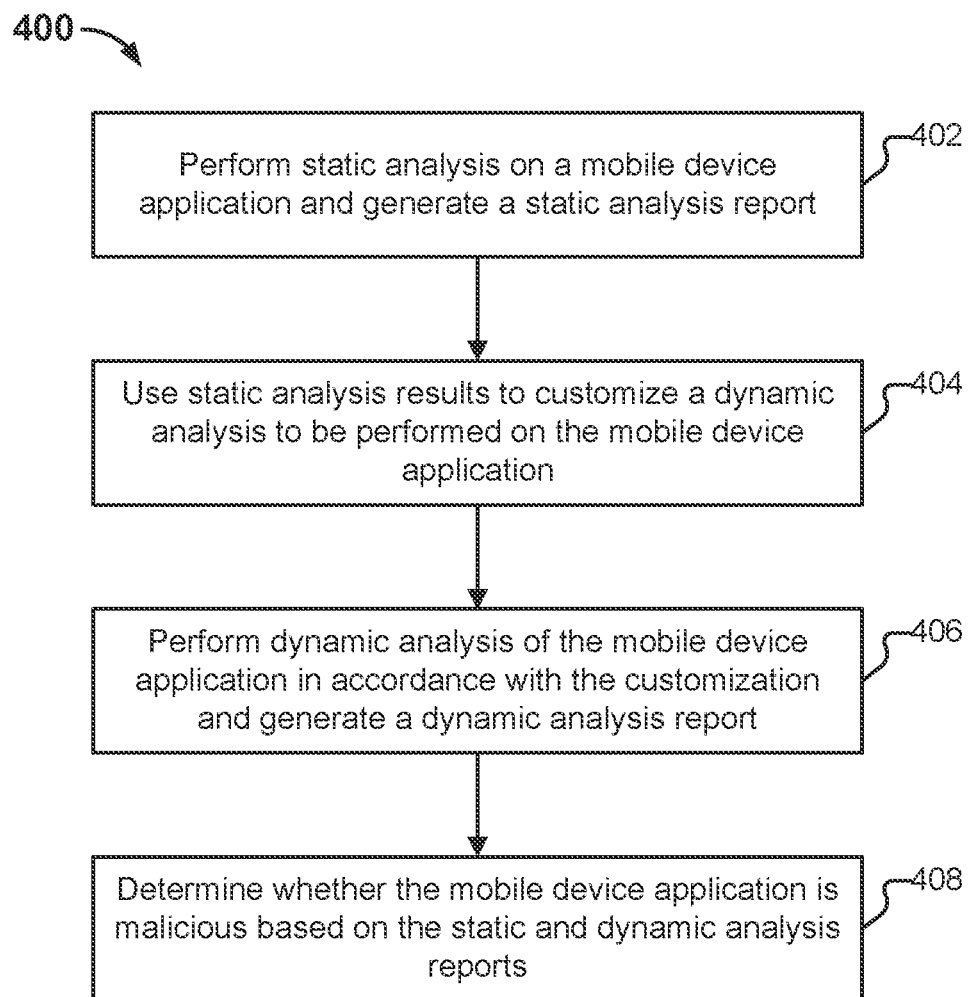
FIG. 4 illustrates an embodiment of a process for determining whether a mobile device application is malicious.

FIG. 4 illustrates an embodiment of a process for determining whether a mobile application is malicious. In various embodiments, process 400 is performed by mobile malware analysis system 300. As will be described in more detail below, process 400 can be used in conjunction with other processes performed in the environment shown in FIG. 1 (or embodiments thereof). The process begins at 402 when static analysis is performed on a mobile malware application. As one example, static analysis is performed on an application, such as "game.apk" by a static analysis engine 306 at 402. Suppose "game.apk" is malicious and will delete all of the SMSes in a user's Inbox if the device it is running on receives an SMS from ChinaMobile's service number (e.g. "10086"). The application does this to hide notifications pertaining to phone billing from the end user, so that the end user will not be alerted to atypical spending patterns (e.g., premium SMS purchases). During static analysis, a determination would be made that the game.apk application has access to SMS content. This capability of the application (along with other information, examples of which are provided above) is included in a static analysis report by the static analysis engine. At 404, the static analysis report is used to customize a dynamic analysis to be performed on the mobile device application. As one example, since the application has access to SMS content, the dynamic analysis will be customized to include sending a variety of SMS messages. Other device resources to which the application does not have access (e.g., GPS location information) will not be simulated and thus can be excluded from the customized dynamic analysis plan. At 406, dynamic analysis of the application is performed using a dynamic analysis engine. One example of the dynamic analysis performed includes sending SMSes appearing to originate from a variety of sources, including 10086 (i.e., the service number of ChinaMobile) to the emulator. Sending such an SMS is an example of an "external event" (as is a simulated location change)—contrasted with an "internal event" (e.g., where button presses or file opens/closes are simulated). When game.apk deletes the SMS Inbox upon receiving the simulated incoming SMS from ChinaMobile, the game.apk's actions will be captured and logged. The dynamic analysis engine will examine the logged behavior in conjunction with creating a dynamic analysis report—and determine that the application has taken a malicious action with respect to SMS messages. Finally, at 408 a determination is made as to whether the mobile device application is malicious, based on the static and dynamic analysis reports. In this example, coordinator 304 examines the static analysis report (concluding that the application is "suspicious") and dynamic analysis report (concluding the application is "malicious") and determines that game.apk is malicious.

In some cases, static analysis engine 306 might conclude an application is malicious, while dynamic analysis engine 310 might conclude the application is merely suspicious. In various embodiments, the final decision rendered by the mobile malware analysis system 300 uses the more severe of the two assessments (e.g., concluding the application is malicious based on the static analysis report). In various embodiments, the final verdict is determined by coordinator 304 assigning points to each of the features triggered by the application (i.e., both the static features and the dynamic features). If the score exceeds a threshold, the application is determined to be malicious. More sophisticated scoring rubrics can also be used in conjunction with the techniques described herein, such as ones which weight dynamic analysis results more heavily than static analysis results. As will be described in more detail below, a variety of actions can be taken in response to determinations made as a result of the static and/or dynamic analysis performed by system 300.

In some embodiments, coordinator 304 (or another appropriate component) is configured to revise one or more heuristics based on process 400. As one example, static analysis engine 306 might determine that a given application is configured to send an SMS message, but static analysis engine 306 is unable to determine whether the SMS is in fact malicious (e.g., to a 900 number). One reason static analysis engine 306 might not know that the SMS is malicious is because the number is encoded in a way not previously seen by system 300. Another reason static analysis engine 306 might not know the SMS is malicious is because the number is fetched from a URL included in the application (but not known to system 300 to be a malicious URL). During dynamic analysis of the application, a determination might be made that the number to which the SMS is sent is in fact malicious (e.g., by comparing log information against a collection 314 of malicious/premium numbers). The static analysis rules can be revised to indicate that, in the future, if the encoded information representing the 900 number is encountered in any new applications, those applications are malicious (rather than suspicious). As another example, collection 314 can be refined to include the URL as known malicious. When a future application is evaluated by static analysis engine 306 that includes the URL, the static analysis engine will conclude that the application is malicious (instead of suspicious) based on the presence of the URL in collection 314.

Integrating Application Analysis and Endpoint Protection

Figure 5:
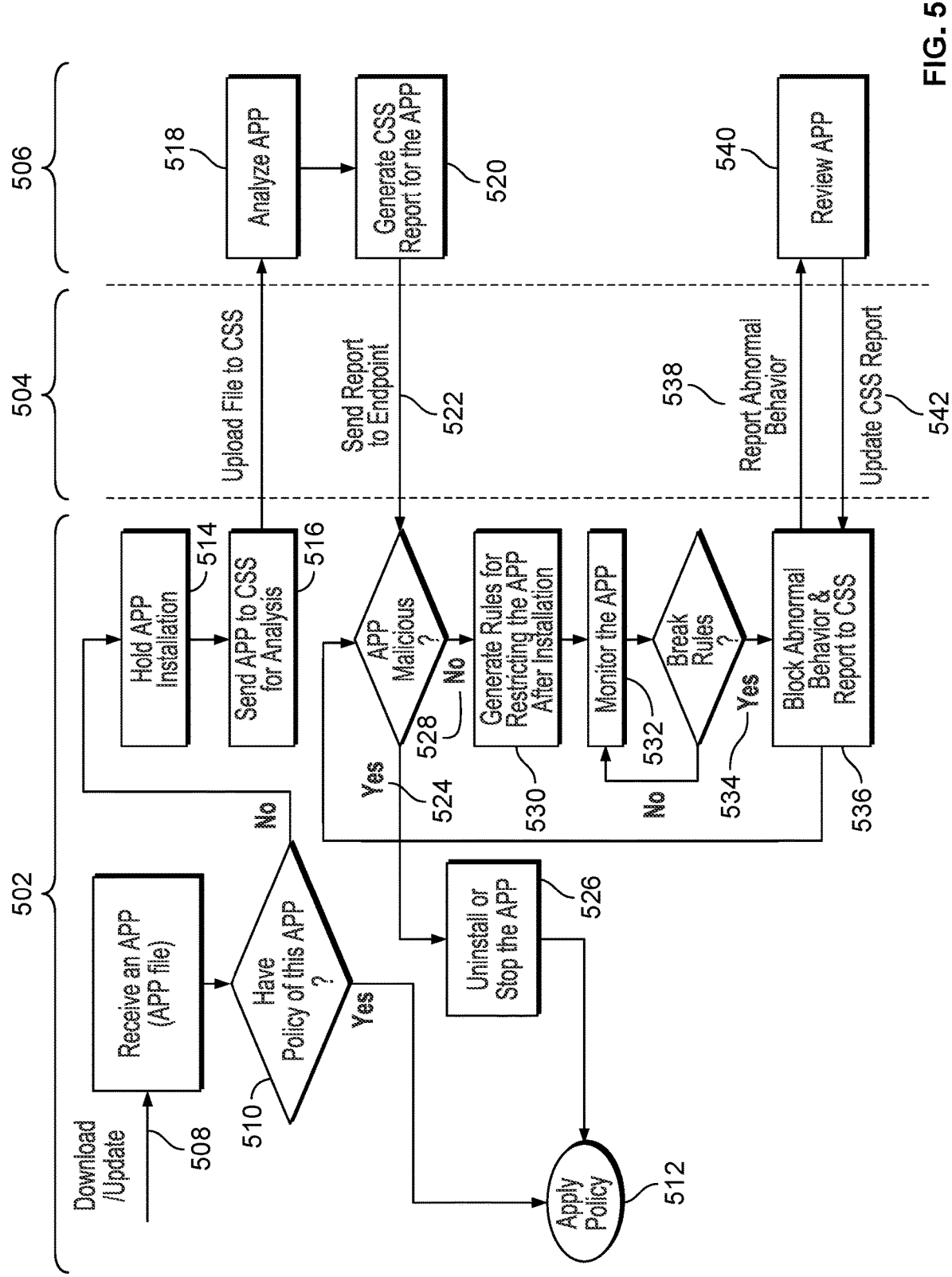
FIG. 5 is a diagram illustrating interactions between a cloud security service and an endpoint application in various embodiments.

FIG. 5 is a diagram illustrating interactions between a cloud security service and an endpoint application in various embodiments. As shown, an endpoint protection application (e.g., any of applications 154-158) is configured to securely communicate with a cloud security service (e.g., service 122) via one or more secure communications channels (denoted by region 504). Examples of such channels include direct connections (e.g., using one or more Application Programming Interfaces), such as where endpoint application 158 communicates with service 122 via network 118 via SSL, and indirect connections (e.g., where endpoint applications 154 and 156 communicate with MDM server 146 and/or appliance 102 which in turn communicate with service 122 via a VPN or other appropriate mechanism). In various embodiments, devices 104 and 106 communicate directly with service 122 (e.g., without communicating via appliance 102 or MDM server 146). Actions occurring on a device, such as device 108, are shown in region 502. Actions occurring on a cloud security service, such as service 122, are shown in region 506.

At 508, an application is downloaded by a device such as device 108. The application can be downloaded in response to a user request to install a new application (e.g., by the user interacting with an appstore or otherwise downloading the application) and can also be an attempted update of an already installed application. At 510, a determination is made (e.g., by endpoint protection application 158) as to whether a policy is already present for the application. As one example, endpoint protection application 158 can take an MD5, SHA-256, or other hash of the downloaded application and compare it to a list of whitelisted/blacklisted applications stored locally on device 108 (e.g., in a storage area used by endpoint protection application 158). If the application is whitelisted, it can be installed and if the application is blacklisted, it cannot (512). The white/blacklists can be obtained in a variety of ways, including as part of a subscription service (e.g., offered by the author of the endpoint protection application, offered by a carrier or manufacturer associated with the device, offered by service 122, maintained by an administrator of an enterprise network, etc.). Further, entities such as an administrator of network 110 or other appropriate entity, can specify (e.g., via MDM server 146, via configurations installed on devices 104-106, and/or via configurations of appliance 102) and/or configure customized whitelist/blacklist options. For example, while a given application might not be deemed malicious by cloud security service 122, regulatory compliance or other obligations may require that certain actions taken by certain applications be blocked. Using techniques described herein, such activities can be blocked by an administrator of network 110 customizing endpoint protection applications 154/156 (or otherwise implementing such rule refinements against devices 104/106).

Suppose an attempt is made to install an application for which the endpoint protection application does not have existing policy information (i.e., the application is not present on a locally stored white/blacklist). In some embodiments, the process of installing (or, as applicable, updating) the app on the device is held (514) while the endpoint protection application collects additional information about the application. An example way of holding an install on an Android device is described in conjunction with FIG. 6. In other embodiments, the application is allowed to be installed, but with restricted functionality (e.g., enforced by endpoint protection application 158) until results pertinent to the application are received from cloud security service 122. For example, endpoint protection application 158 can allow the application to be installed and to run, but prevent it from accessing personal information about the user, such as user location information and address book information, until additional information is received from cloud security service 122. In yet other embodiments, the application is allowed to be installed (with portion 514 omitted) and operates without restriction, but will be uninstalled (e.g., by endpoint protection application 158) in the event cloud security service 122 returns results indicative of the application being malicious.

At 516, the application is transmitted to the cloud security service. As mentioned above, the transmission can occur in a variety of ways. A copy of the file can be provided by device 108 to cloud security service 122; an MD5, SHA-256, or other hash value can be taken of the application and transmitted at 516; a link to the source of the application (e.g., a link to the app store from which it was obtained) can be provided by device 108 to service 122; etc.

At 518, cloud security service 122 analyzes the received application and generates one or more reports (520) documenting the permissions used by the app, the actions taken by the app, etc. (e.g., in accordance with process 400 or embodiments thereof). At 522, cloud security service 122 transmits to device 108 results of its analysis. The results can include a verdict (e.g., indicating whether the application is malicious or not) and other information usable to generate a set of rules for constraining the application if executed. As one example, suppose cloud security service 122 determines that the application is malicious (524). Endpoint protection application 158 (which is, in some embodiments, currently holding the installation of the application (514)) can terminate the install process (526). In the event the installation was not held (e.g., the functionality to hold an application's installation is not supported by endpoint protection application 158), the nowdetermined-to-be malicious application can instead be uninstalled at 526, as applicable, or permanently stopped from running.

As an additional example, suppose cloud security service 122 determines that the application is not malicious (528). Included in the information transmitted by cloud security service 122 to device 108 is a list of behaviors observed during analysis and confirmed as benign. Endpoint protection application 158 can allow the installation of the application and use the list of behaviors to form a set of rules constraining the execution of the application (530). For example, suppose that during analysis by cloud security service 122, an application accesses four URLs, each of which has been determined by cloud security service 122 to be benign. Endpoint protection application 158 can restrict the application, once installed, from accessing any URLs that are outside the set of the four previously observed URLs. Similarly, if the application does not use user location information while being analyzed by cloud security service 122, endpoint protection application 158 can create and enforce a set of rules restricting the application, once executing on device 108, from making use of user location information.

Three example scenarios for monitoring/blocking are as follows. Scenario 1: Based on a report received from cloud security server 122, endpoint protection application 158 collects a list of URLs/domains that an application uses during execution on device 108. The native Android OS's connect( ) system call is hooked, such that decisions to allow access to only verified URLs can be enforced against the particular application. If the application attempts to visit URLs/domains not included in the received report, the endpoint protection application will take actions based on policies defined by an administrator of the device (e.g., the end user, carrier, IT department where it is an employee phone, etc.). For example, the endpoint protection application can block access to the additional URLs, show warning notifications, etc. In addition, the behavior of the application visiting the abnormal URLs/domains can be reported to the cloud security server (e.g., as shown at 538 in FIG. 5). Scenario 2: An administrator of a device (e.g., the end user of device 108, an administrator of devices 104-106, etc.) can decide to block specific sensitive capabilities, like sending SMSes, for certain applications. One way to achieve this is to hook the Android SendSMS routine and deny any attempts by an application to send an SMS. Similar approaches can be applied to other hardware services, like GPS, microphone, camera etc. Scenario 3: Some malware abuses the Android IntentService. The endpoint protection application can hook this API capability, monitoring for and intervening in the API calls related to the targeted application. Abnormal intent can be blocked or processed according to predefined policies. Further, forensic information can be logged and reported to cloud security service 122 for further analysis.

In various embodiments, endpoint protection application 158 may be unable to prevent an application from taking actions on a device (e.g., due to limitations on integrating into the device's operating system or other software). In such a scenario, endpoint protection application 158 can instead observe behaviors taken by a given application, compare the behaviors against the list of observed benign behaviors provided by cloud security service 122, and report any additional behaviors taken by the executing application (e.g., back to cloud security service 122). Cloud security service 122 can use the reported information to re-analyze the application, augment its information about the application, etc., as applicable. An example of this process is illustrated in FIG. 5. In particular, once an application is installed, its execution is monitored (e.g., by endpoint protection application 158) at 532. In the event the application attempts to take actions not observed during cloud security service 122's analysis (534), those additional actions can be blocked (536) by the endpoint protection application. Further, the additional actions can be reported to cloud security service 122 (538), which can in turn perform additional analysis of the application (540). In some cases, the additional behaviors may be benign. For example, where an application only made use of four URLs during initial examination by cloud security service 122, it may be the case that the application needs access to a total of five URLs to function properly. An attempt to use the fifth URL was not made until the application was executing on an actual device, but the access to that URL is also benign and can be permitted. Cloud security service 122 can update its information about the application (after confirming that the fifth URL is benign) and send an updated report to device 108 (542) enlarging the scope of permitted behavior to include accessing the fifth URL. (I.e., the rules associated with the application and enforced by the endpoint protection application can be revised to permit the additional behavior of accessing the fifth URL.) In the event the fifth URL is malicious, the updated report can similarly indicate that the application that was previously considered to be benign is in fact malicious and should be blocked from accessing that URL/uninstalled/etc., as applicable.

Figure 6:
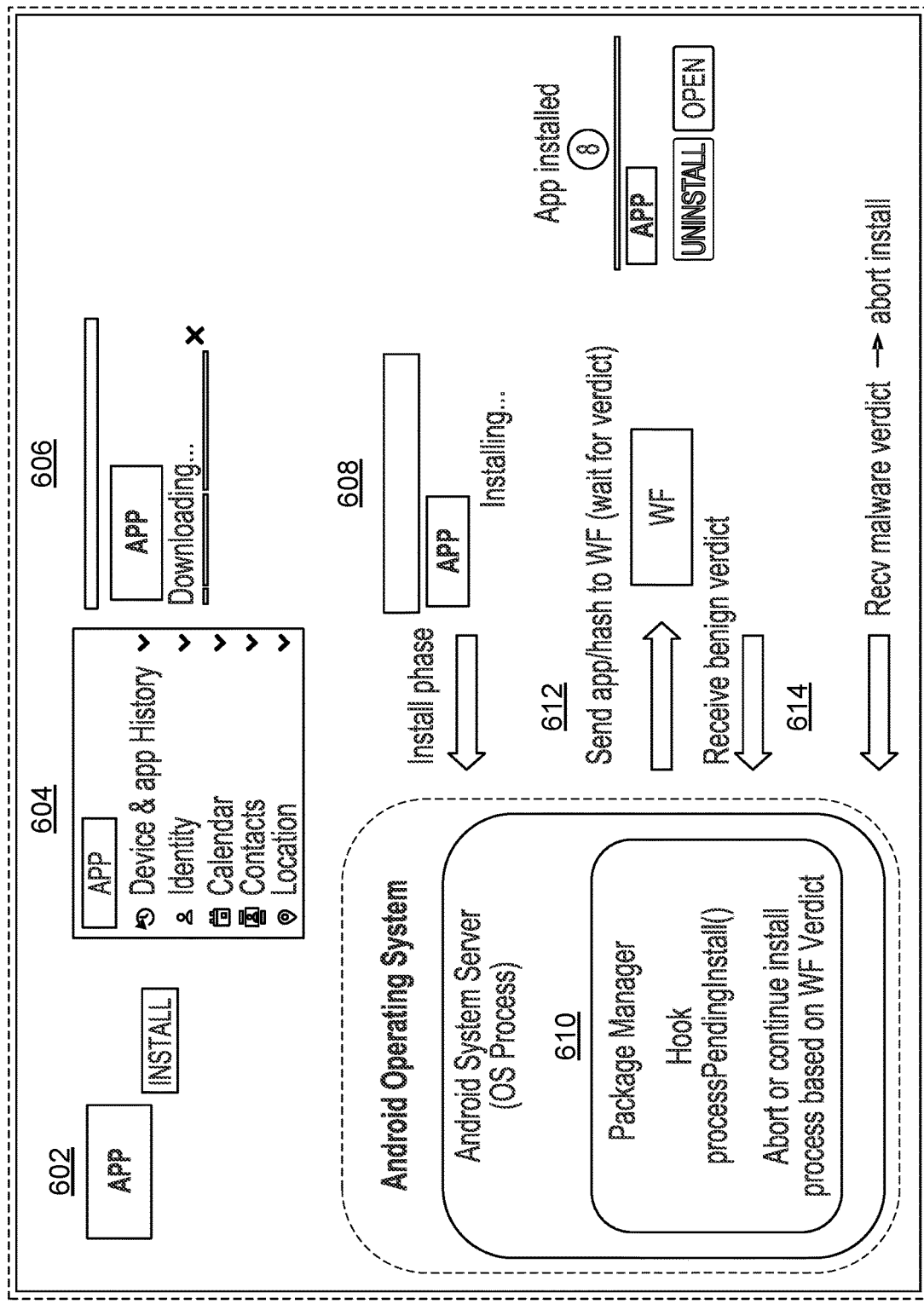
FIG. 6 illustrates a workflow for holding the installation of applications on an Android system until a verdict can be received from a cloud security service.

FIG. 6 illustrates a workflow for holding the installation of applications on an Android system until a verdict can be received from cloud security service 122. Other approaches can be used with other operating systems as applicable, and/or the techniques described herein adapted accordingly. Portions 602-606 of the workflow proceed as with a typical installation of an android application. At 602, a user interacts with a dialog to indicate that the user wishes to install an application. At 604, the user is shown a list of permissions that the application requires. At 606, the application is downloaded to the device and stored in the device filesystem. In various embodiments, endpoint protection software (e.g., endpoint protection application 158) places hooks within the Android operating system (e.g., the package manager). At 608, the hooks intercept the standard application installation process, holding the install until a verdict/ other information can be received from cloud security service 122 about the application to be installed (612).

As mentioned above, in the event the verdict is that the application is benign (614), the installation process can continue. In the event the verdict is that the application is malicious, the installation process can be terminated (e.g., by informing the installer that the install failed). As mentioned above, endpoint protection (and, specifically, the ability to make use of techniques described herein) can be provided to device 108 by a variety of entities. Examples include carriers, OEM/chip vendors, IT departments of enterprise companies (e.g., of work phones to employees) etc. Such entities can modify the stock Android OS (610) to provide the hooks, and in various embodiments, the stock Android OS can (e.g., in future versions) natively support the functionality described herein. Endpoint protection application providers (e.g., where different from the previously mentioned entities) can also provide customized Android OS customized Android ROMs) with endpoint protection support built in.

Figure 7:
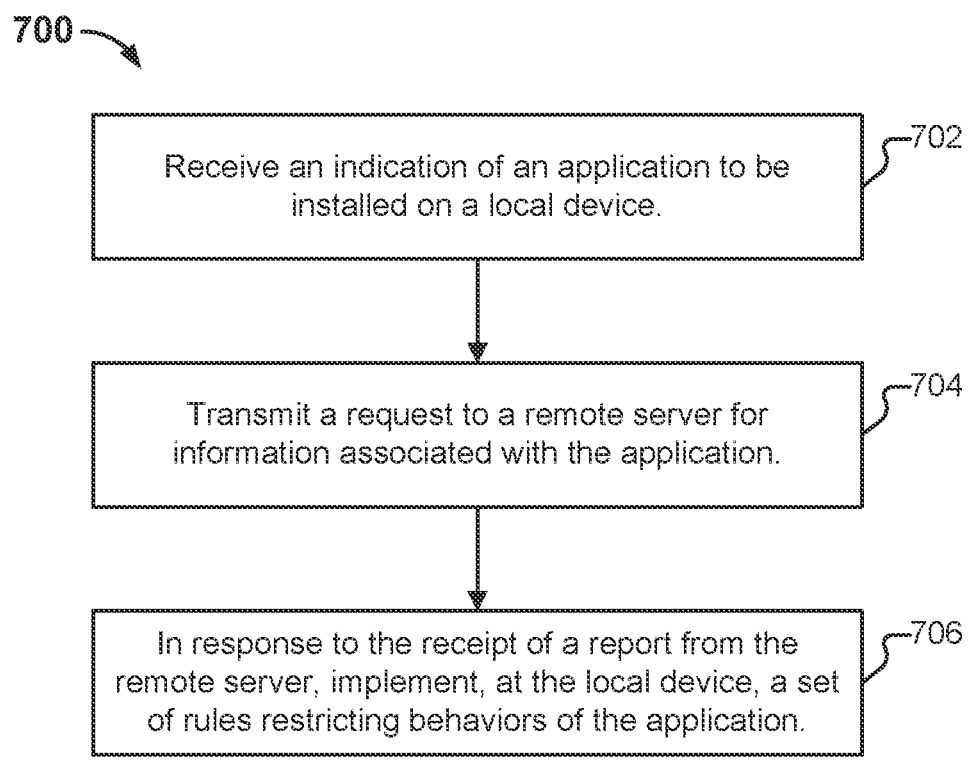
FIG. 7 illustrates an embodiment of a process for vetting an application with a remote service in conjunction with installation of the application on a local device.

FIG. 7 illustrates an embodiment of a process for vetting an application with a remote service in conjunction with installation of the application on a local device. In various embodiments, process 700 is performed by a device such as any/all of devices 104-108. The process begins at 702 when an indication of an application to be installed on a local device is received. As one example, such an indication is received at 702 when a user clicks the "install" button shown in region 602 of FIG. 6. As another example, such an indication is received at 702 as described in conjunction with portion 508 of FIG. 5. At 704, a request for information associated with the application is transmitted to a remote server. As one example, the transmission of such a request is described in conjunction with portion 516 of FIG. 5. Finally, at 706, in response to the receipt of a report from the remote server, a set of local rules restricting behaviors of the application is implemented. Examples of the processing performed at 706 are described in conjunction with portions 530-536 of FIG. 5.

Figure 8:
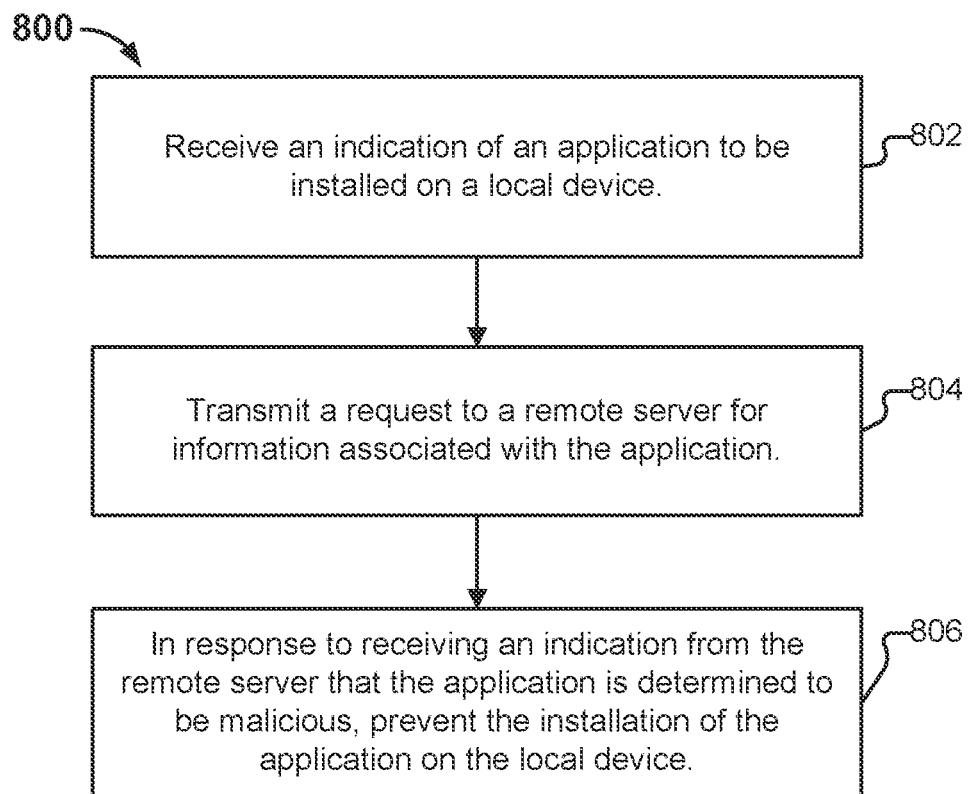
FIG. 8 illustrates an embodiment of a process for preventing the installation of a malicious application.

FIG. 8 illustrates an embodiment of a process for preventing the installation of a malicious application. In various embodiments, process 800 is performed by a device such as any/all of devices 104-108. The process begins at 802 when an indication of an application to be installed on a local device is received. As one example, such an indication is received at 802 when a user clicks the "install" button shown in region 602 of FIG. 6. As another example, such an indication is received at 802 as described in conjunction with portion 508 of FIG. 5. At 804, a request for information associated with the application is transmitted to a remote server. As one example, the transmission of such a request is described in conjunction with portion 516 of FIG. 5. Finally, at 806, in response to the receipt of a report from the remote server that the application is malicious, the application is prevented from being installed (526), or as applicable, uninstalled.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   receive, at a server, an indication of an application to be installed on a client device;
   determine, by the server, in response to receipt of the indication that the application is to be installed on the client device, that dynamic analysis should be performed on a copy of the application;
   in response to determining that dynamic analysis should be performed, perform, at the server, dynamic analysis on a copy of the application, wherein the copy of the application is executed in an instrumented environment configured to log activities that occur within the environment, wherein performing the dynamic analysis includes recording behaviors taken by the application while executing in the instrumented environment, and wherein the set of observed behaviors includes attempting to access a set of one or more URLs;
   transmit to the client device a list of the observed behaviors taken by the application while executing in the instrumented environment as a set of known behaviors taken by the application during dynamic analysis, wherein the transmitted list includes the set of one or more URLs observed during the performed dynamic analysis; and
   in response to receiving a notification from the client device that the client device has detected that an attempt was made by the application, while executing on the client device, to take an action not included on the list of observed behaviors taken by a copy of the application while executing in the instrumented environment, take, at the server, a remedial action with respect to the application; and
   a memory coupled to the processor and configured to provide the processor with instructions.

2. The system of claim 1 wherein the client device is configured to report the attempt to a user of the client device.

3. The system of claim 1 wherein the remedial action includes performing, by the processor, an evaluation of the application.

4. The system of claim 1 wherein the processor is configured to evaluate an updated version of the application in response to receiving an indication that the application has been updated.

5. The system of claim 1 wherein the processor is further configured to determine a verdict of whether the application is malicious.

6. The system of claim 1 wherein the processor is further configured to cause the client device to uninstall the application at the local device.

7. The system of claim 1 wherein the processor is configured to take a remedial action in response to a determination that the application has attempted to access a URL not included in the set of observed URLs.

8. The system of claim 1 wherein the set of observed behaviors does not include using user location information.

9. The system of claim 8 wherein the processor is configured to take a remedial action in response to a determination that the application has attempted to use user location information.

10. The system of claim 1 wherein, in response to a determination made by the processor that the reported attempt made by the application corresponds to benign activity, the client device is provided with an updated set of rules that include the attempt in the whitelisted set of behaviors.

11. The system of claim 1 wherein installation of the application at the client device is held until the set of rules constraining behaviors of the application when executed on the client device is received at the client device.

12. The system of claim 1 wherein the indication is received from the client device in conjunction with an installation operation.

13. The system of claim 1 wherein the indication is received from the client device in conjunction with a download operation.

14. A method, comprising:
receiving, at a server, an indication of an application to be installed on a client device;
determining, by the server, in response to receipt of the indication that the application is to be installed on the client device, that dynamic analysis should be performed on a copy of the application;
in response to determining that dynamic analysis should be performed, performing, at the server, dynamic analysis on a copy of the application, wherein the copy of the application is executed in an instrumented environment configured to log activities that occur within the environment, wherein performing the dynamic analysis includes recording behaviors taken by the application while executing in the instrumented environment, and wherein the set of observed behaviors includes attempting to access a set of one or more URLs;
transmitting to the client device a list of the observed behaviors taken by the application while executing in the instrumented environment to the client device as a set of known behaviors taken by the application during dynamic analysis, wherein the transmitted list includes the set of one or more URLs observed during the performed dynamic analysis; and
in response to receiving a notification from the client device that the client device has detected that an attempt was made by the application while executing on the client device to take an action not included on the list of observed behaviors taken by a copy of the application while executing in the instrumented environment, take, at the server, a remedial action with respect to the application.

15. The method of claim 14 wherein the client device is configured to report the attempt to a user of the client device.

16. The method of claim 14 wherein the remedial action includes performing an evaluation of the application.

17. The method of claim 14 further comprising evaluating an updated version of the application in response to receiving an indication that the application has been updated.

18. The method of claim 14 further comprising determining a verdict of whether the application is malicious.

19. The method of claim 14 further comprising causing the client device to uninstall the application at the local device.

20. The method of claim 14 further comprising taking a remedial action in response to a determination that the application has attempted to access a URL not included in the set of observed URLs.

21. The method of claim 14 wherein the set of observed behaviors does not include using user location information.

22. The method of claim 21 further comprising taking a remedial action in response to a determination that the application has attempted to use user location information.

23. The method of claim 14 wherein, in response to determining that the reported attempt made by the application corresponds to benign activity, the client device is provided with an updated set of rules that include the attempt in the whitelisted set of behaviors.

24. The method of claim 14 wherein installation of the application at the client device is held until the set of rules constraining behaviors of the application when executed on the client device is received at the client device.

25. The method of claim 14 wherein the indication is received from the client device in conjunction with an installation operation.

26. The method of claim 14 wherein the indication is received from the client device in conjunction with a download operation.

* * * * *